(No Model.)
R. A. AUSTIN.
LOOSE PULLEY LUBRICATOR.
No. 376,466. Patented Jan. 17, 1888.
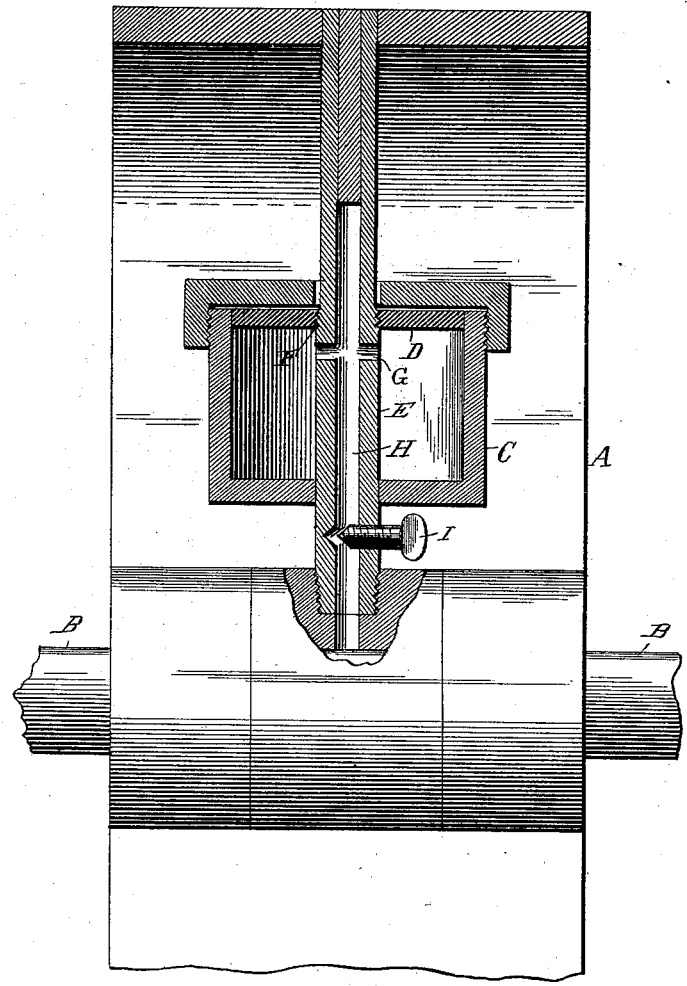
Witnesses
H. Raeder.
T. E. Robertson.
Inventor
Robert A. Austin
By his Attorney
T. J. W. Robertson

UNITED STATES PATENT OFFICE.

ROBERT A. AUSTIN, OF SANDUSKY, OHIO, ASSIGNOR TO THE WILLIAM P. MILLER COMPANY, OF BROOKLYN, NEW YORK.

LOOSE-PULLEY LUBRICATOR.

SPECIFICATION forming part of Letters Patent No. 376,466, dated January 17, 1888.

Application filed May 12, 1887. Serial No. 237,976. (No model.)

*To all whom it may concern:*

Be it known that I, ROBERT A. AUSTIN, of Sandusky, in the county of Erie and State of Ohio, have invented new and useful Improvements in Loose-Pulley Lubricators; and I do hereby declare that the following is a full, clear, and exact description thereof, reference being had to the accompanying drawing, which forms a part of this specification.

This invention relates to certain new and useful improvements in loose-pulley lubricators; and the invention consists in the peculiar construction, arrangement, and combination of parts whereby the centrifugal force created by the motion of the pulley forces the lubricant onto the shaft of the pulley, all as more fully hereinafter described.

In the drawing which accompanies this specification my improved lubricator is shown in vertical central section as applied to a loose pulley, A, of ordinary construction, and journaled upon a shaft, B.

C is the cup for the lubricant, and D is a plunger fitting the cylindrical bore of the cup.

A stem, E, is radially secured to the hub of the pulley and extends to the rim thereof, and upon this stem the cup is axially sleeved, while the plunger D is stationarily secured thereon, there being preferably a screw-thread, F, cut upon the stem for that purpose.

The lubricant in the cup communicates through one or more openings, G, in the stem with a duct, H, provided for in the stem and extending into the hub, from whence the lubricant is discharged onto the shaft. A suitable valve, I, is arranged to control the flow of the lubricant through the duct H.

The stem E is preferably made of a piece of pipe screw-threaded into the hub and plugged up at the outer end to prevent the escape of the lubricant in the wrong direction, and the outer end of the stem is preferably engaged in a hole in the rim of the pulley, all so arranged that the whole device may be readily applied to the pulley and quickly removed, if desired, although the cup may be refilled without removing it.

In practice, the parts being arranged as shown and described, the operation is intended to be as follows: The centrifugal force imparted to the cup by the motion of the pulley, being free to act in the radial direction of the stem E, compresses the lubricant which is confined between the walls of the cup and the plunger D, and thereby forces it through the opening or openings G into the duct H of the stem, and through it onto the shaft of the pulley. Its flow may be easily regulated by means of the valve I, which may be a simple screw, as shown.

The lubricant best adapted for my pulley-lubricator is grease or other solid lubricant.

What I claim as my invention is—

1. In a loose-pulley lubricator, a stem radially secured to the hub of the pulley and extending to the rim thereof, a cup axially sleeved upon said stem, a plunger secured to said stem and operating within the cup, and a duct in said stem to carry the lubricant from the cup to the shaft of the pulley, all arranged to operate substantially as described.

2. As a new article of manufacture, a loose-pulley lubricator consisting of a tube closed at one end and screw-threaded at the other end, and extending from the hub to the rim of the pulley, a cup axially sleeved upon said tube, a plunger secured upon a screw-thread formed upon said tube and operating as a piston within the cup, one or more openings for the discharge of the lubricant from the cup into the tube, and a valve in the tube to control the discharge therefrom, all arranged to operate substantially as described.

3. In a loose-pulley lubricator, a stem radially secured between and extending from the hub and rim of the pulley, a cup axially sleeved upon the stem, a plunger-piston secured to said stem within the cup, a passage for the lubricant from the cup through the stem to the shaft of the pulley, and a valve in the stem, all arranged and combined to operate substantially as specified.

ROBERT A. AUSTIN.

Witnesses:
H. S. SPRAGUE,
A. BARTHEL.